Oct. 9, 1951           J. J. FANNEN           2,570,657

ELECTRICALLY HEATED RETREADING MOLD FOR TIRES

Filed May 7, 1949           2 Sheets-Sheet 1

INVENTOR
J. J. Fannen

ATTORNEYS

Oct. 9, 1951 J. J. FANNEN 2,570,657
ELECTRICALLY HEATED RETREADING MOLD FOR TIRES
Filed May 7, 1949 2 Sheets-Sheet 2

INVENTOR
J. J. Fannen
BY
ATTORNEYS

Patented Oct. 9, 1951

2,570,657

UNITED STATES PATENT OFFICE 2,570,657

ELECTRICALLY HEATED RETREADING MOLD FOR TIRES

John J. Fannen, Lodi, Calif., assignor to Super Mold Corporation of California, Lodi, Calif., a corporation of California Application May 7, 1949, Serial No. 92,034

2 Claims. (Cl. 18—18)

This invention relates generally to the art of tire retreading, and in particular is directed to improvements in mold apparatus for such purpose.

One object of the present invention is to provide a tire retreading mold which is electrically heated; this being accomplished by resistance heating elements mounted in and extending about the mold in heating relation to the tire tread vulcanizing matrix which said mold embodies.

Another object of the invention is to provide a tire retreading mold, as above, in which the resistance heating elements are of a type wherein said elements are elongated and encased, in electrically insulated relation, in a tubular metallic shield.

A further object of the invention is to provide a tire retreading mold, as in the preceding paragraph, in which the resistance heating elements are substantially annular in form and supported in concentric relation in the annular mold body; it being preferable that a plurality of separate resistance heating elements be employed in axially spaced relation in the annular mold halves.

An additional object of the invention is to provide a novel mounting arrangement for the substantially annular resistance heating elements in each of said mold halves; said elements—in such arrangement—being frictionally but releasably seated in snap-in relation in annular, internal grooves in said mold halves.

It is also an object of the invention to provide a tire retreading mold having a structurally simple but effective electric heating assembly therein; said heating assembly being designed for ease and economy of manufacture.

A further object of the invention is to provide a reliable electric heating assembly for tire retreading molds, and one which will be exceedingly effective for the purpose for which it is designed.

These objects are accomplished by means of such structure and relative arrangement of parts as will fully appear by a perusal of the following specification and claims.

Figure 1:
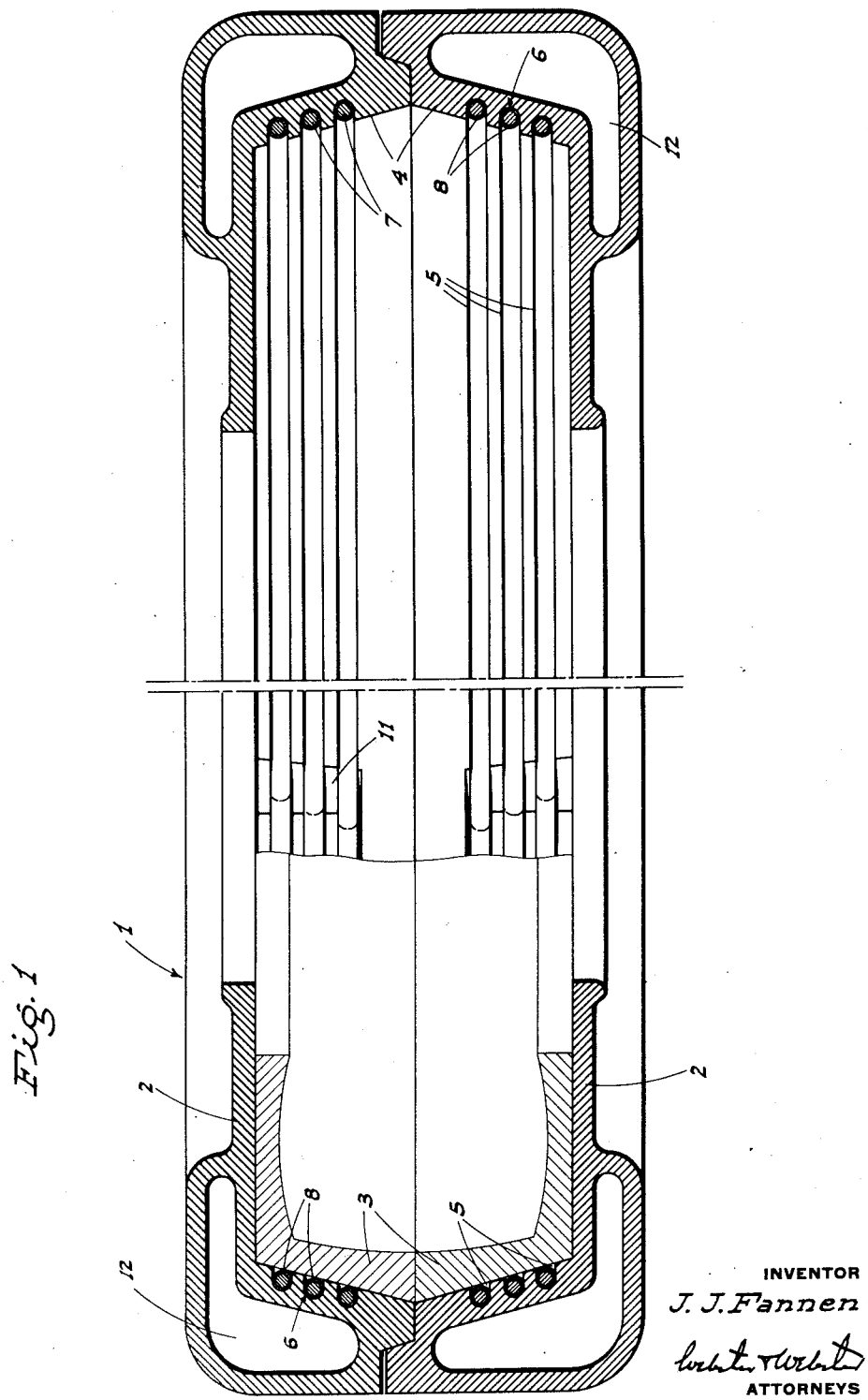
Fig. 1 is a sectional elevation, foreshortened, of a tire retreading mold body embodying the electric heating assembly.
Figure 2:
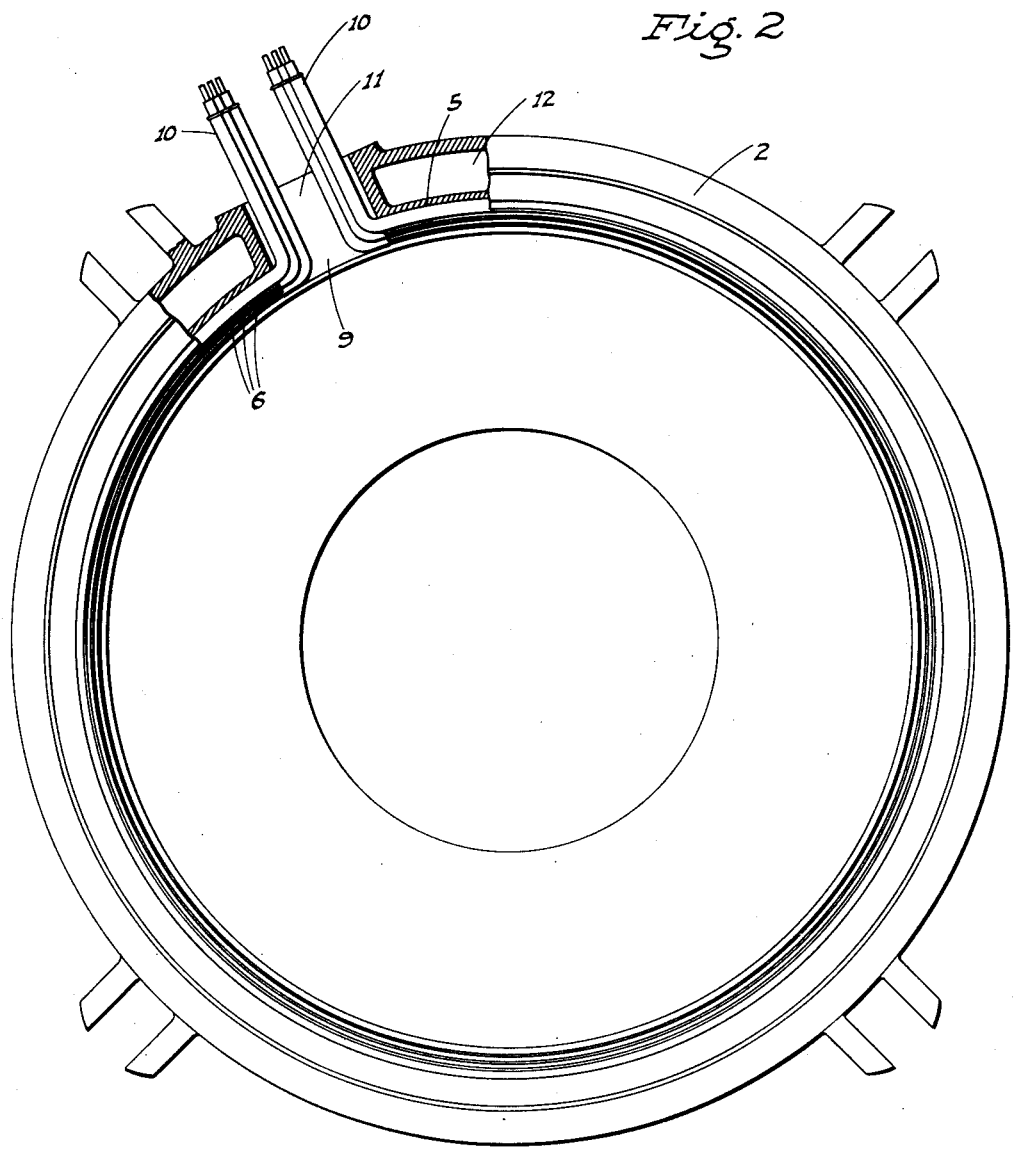
Fig. 2 is a plan view of one mold half, partly broken away, showing the corresponding portion of the electric heating assembly.

Referring now more particularly to the characters of reference on the drawings, the tire retreading mold is of a type which includes an annular body, indicated generally at 1; such body being comprised of initially separate, annular mold halves 2 which engage in matching relation when the mold is in operation. The annular body 1 confines, within the same, a tire tread vulcanizing matrix, indicated generally at 3, which matrix is likewise of two-piece or halved construction.

The inside or working face 4 of each mold half 2, i. e. the face which is in matching engagement with the corresponding half of matrix 3, is formed with a plurality of adjacent but axially spaced annular grooves 5, and these internal grooves each have a substantially annular resistance heating element 6 seating therein.

The resistance heating elements 6 are of a type which comprise an elongated resistance element 7 encased, in electrically insulated relation, in a tubular metallic shield 8.

The outside diameter of the resistance heating elements 6 is slightly less than the depth of the corresponding groove 5, whereby said elements do not project from the grooves, and thus avoid any possible interference with proper mounting and alinement of the halves of matrix 3 in the corresponding halves 2 of the body 1.

While substantially annular, each resistance element 6 has a relatively short gap 9 therein, and adjacent end portions of said element turn laterally outward at said gap as leads 10 adapted for connection to a source of electric current; each corresponding pair of leads 10 projecting through a related slot 11 in the mold half.

The resistance elements 6 are each yieldable and resilient to a certain extent, and by virtue of the provision of the gap 9 therein, each such element can be reduced slightly in diameter by drawing the leads 10 together. As so reduced in diameter such element can be inserted into the corresponding mold half 2 and then released to spring into the corresponding groove 5. Thereafter, each resistance heating element remains frictionally in its groove without tendency toward displacement.

By reason of the described mounting of the resistance heating elements 6, they may be readily removed for replacement if necessary.

When the mold is in operation with the resistance heating elements 6 energized, heat from the latter transfers through the matrix 3 to the new tread rubber or camelback being vulcanized onto a tire within the mold.

The mold halves 2 each include an annular chamber 12 which serves to insulate against undue heat loss in an outward direction. Also, under certain operating conditions it may be desirable to introduce a fluid into such chambers.

The above described invention provides an extremely practical, effective, and yet economical method of heating a tire retreading mold.

While this specification sets forth in detail the present and preferred construction of the device, still in practice such deviations from such detail may be resorted to as do not form a departure from the spirit of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tire mold comprising an annular body unit formed with an annular matrix receiving cavity, matrix elements removably fitted in said cavity, the contiguous portions of the cavity wall and the matrix elements defining matching heat transfer surfaces, there being a plurality of transversely spaced circumferential grooves in the body unit formed outwardly from the heat transfer surface thereof, and an annular electric heating element entirely countersunk in each groove.

2. A mold as in claim 1, with an annular dead air chamber in the body unit radially out from said heat transfer surface, and a radial passageway separated from and cutting across the chamber and intersecting the grooves; each heating element being formed with separated substantially radial terminal portions projecting outwardly through said passageway.

JOHN J. FANNEN.

REFERENCES CITED

The following references are of record in the file of this patent:

UNITED STATES PATENTS

| Number | Name | Date |
|---|---|---|
| 1,879,194 | Grange | Sept. 27, 1932 |
| 2,069,567 | White | Feb. 2, 1937 |
| 2,255,770 | Glynn | Sept. 16, 1941 |
| 2,267,243 | MacMillan | Dec. 23, 1941 |
| 2,315,934 | Chambers | Apr. 6, 1943 |
| 2,407,806 | Arnold et al. | Sept. 17, 1946 |
| 2,456,063 | James | Dec. 14, 1948 |
| 2,509,830 | MacMillan | May 30, 1950 |
| 2,518,142 | Huntington | Aug. 8, 1950 |

FOREIGN PATENTS

| Number | Country | Date |
|---|---|---|
| 5,921 | Great Britain | Apr. 14, 1904 |
| 648,331 | France | Aug. 13, 1928 |